Figure 1:
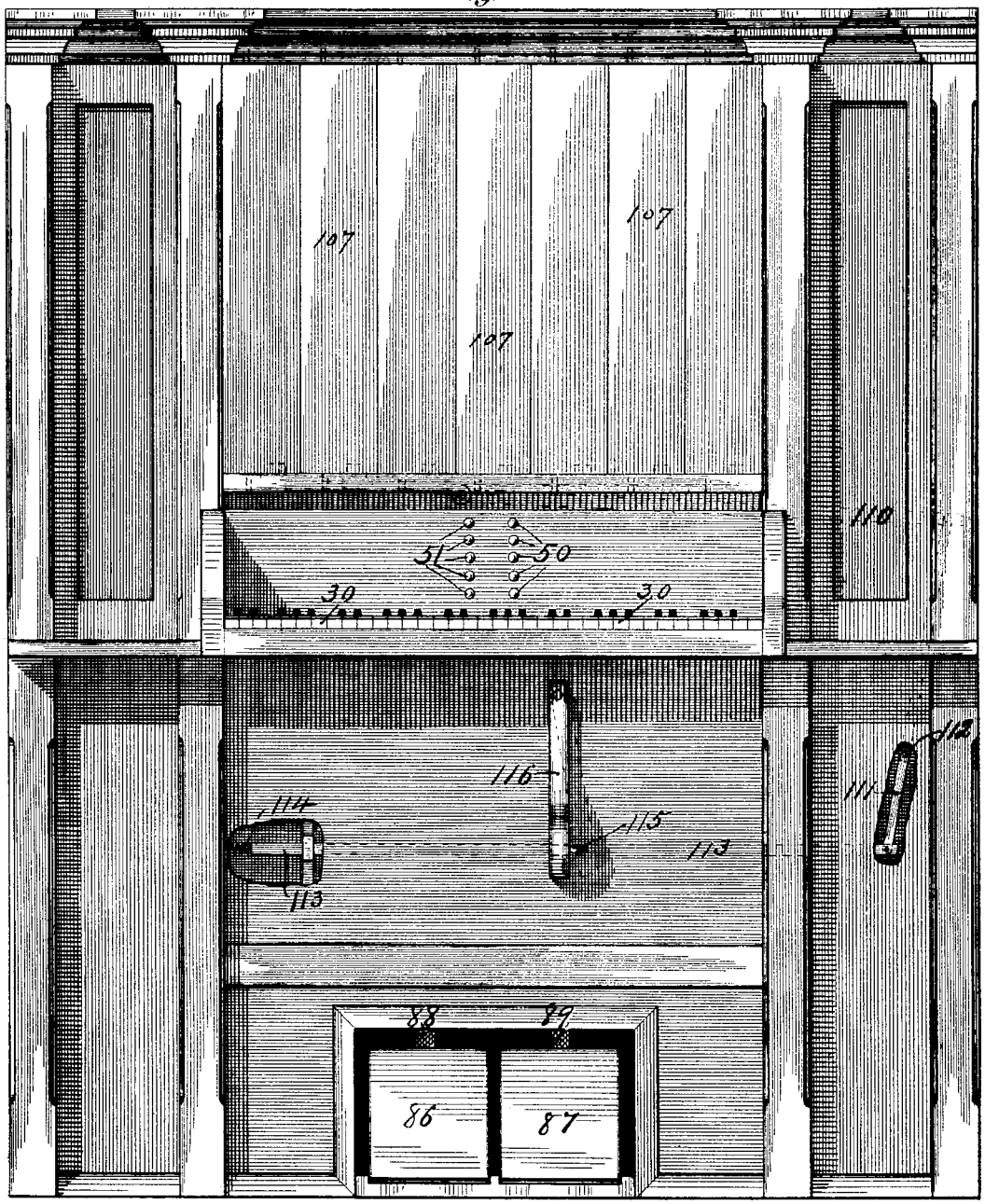

(No Model.)  R. W. JACKSON.  7 Sheets—Sheet 1.
PIPE ORGAN.

No. 480,949.  Patented Aug. 16, 1892.

Witnesses
Charles Pickles
a. W. Davis

Inventor
R. W. Jackson

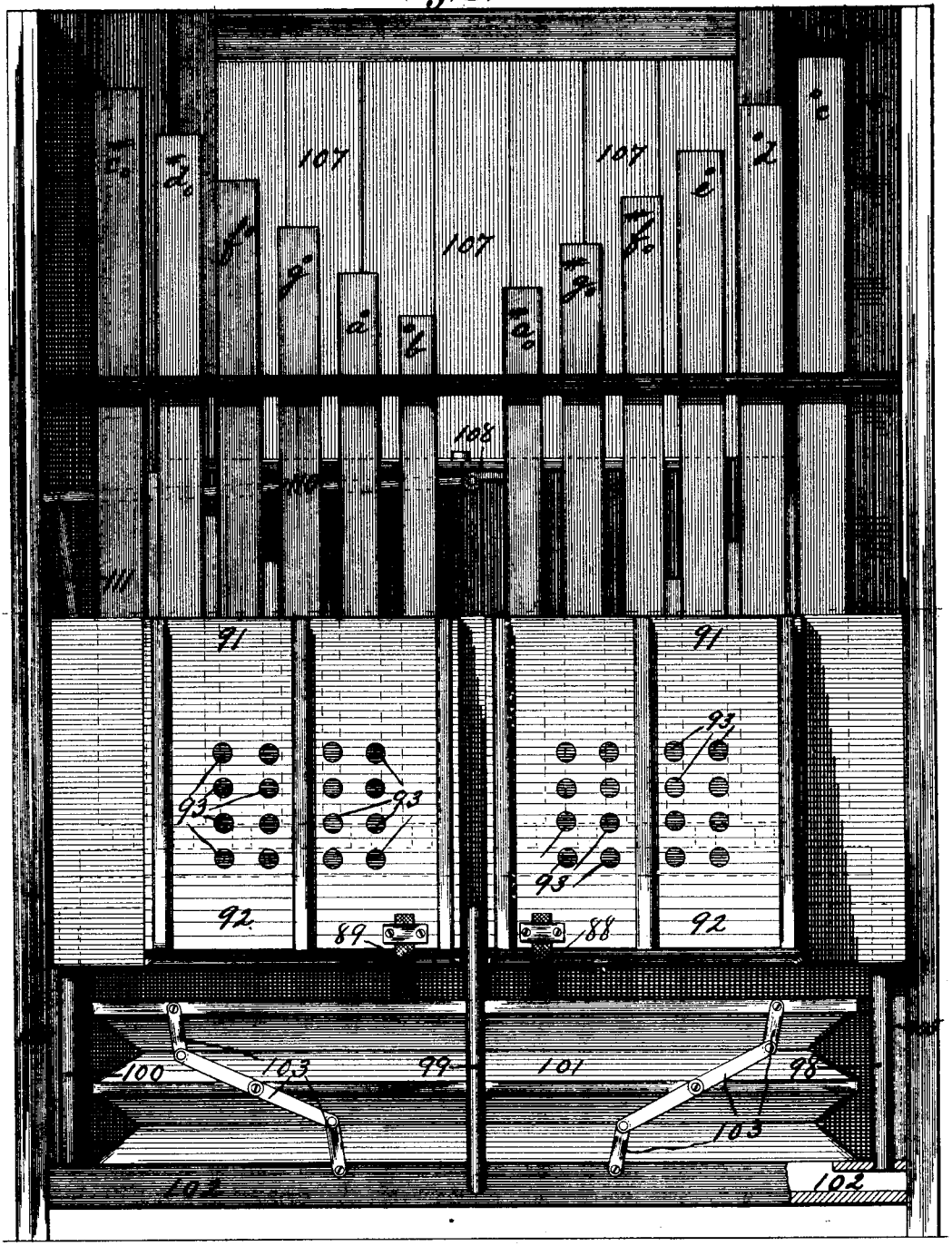

(No Model.) 7 Sheets—Sheet 3.
R. W. JACKSON.
PIPE ORGAN.
No. 480,949. Patented Aug. 16, 1892.
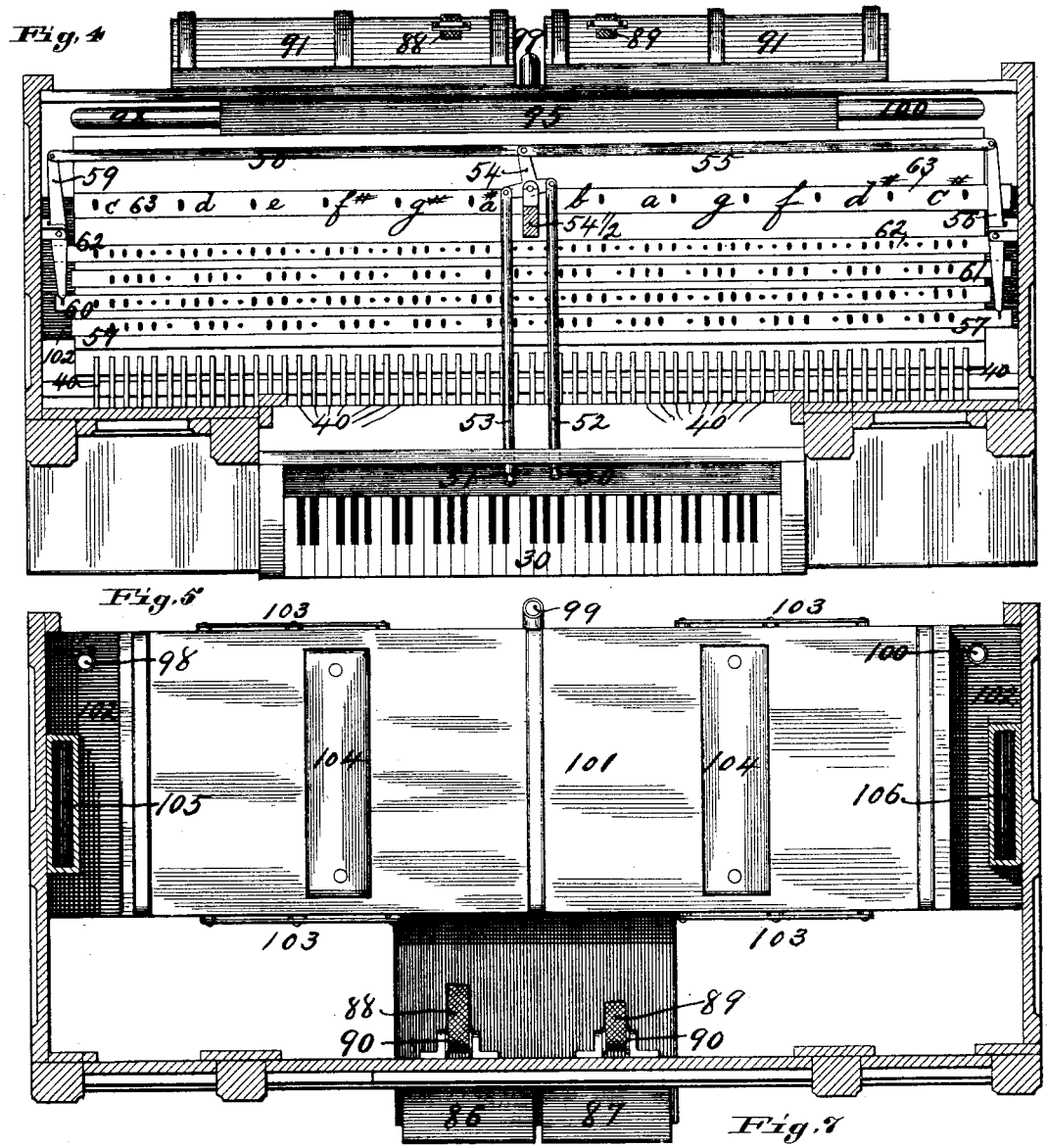
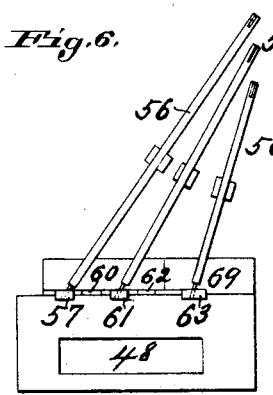
Witnesses:
Charles Pickles.
A. W. Davis
Inventor:
R. W. Jackson,
By Fowler & Fowler
Attorneys
THE NORRIS PETERS CO., PHOTO-LITHO., WASHINGTON, D. C.

(No Model.) 7 Sheets—Sheet 4.
R. W. JACKSON.
PIPE ORGAN.
No. 480,949. Patented Aug. 16, 1892.
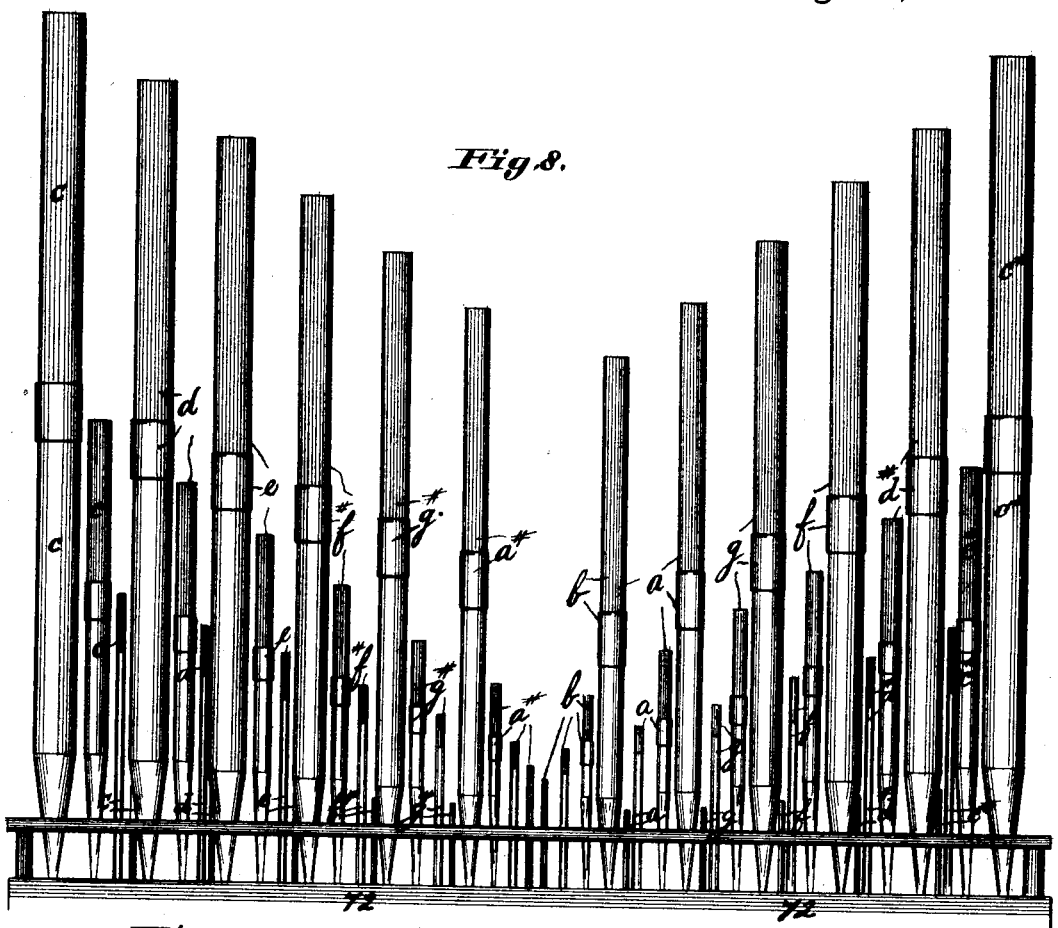
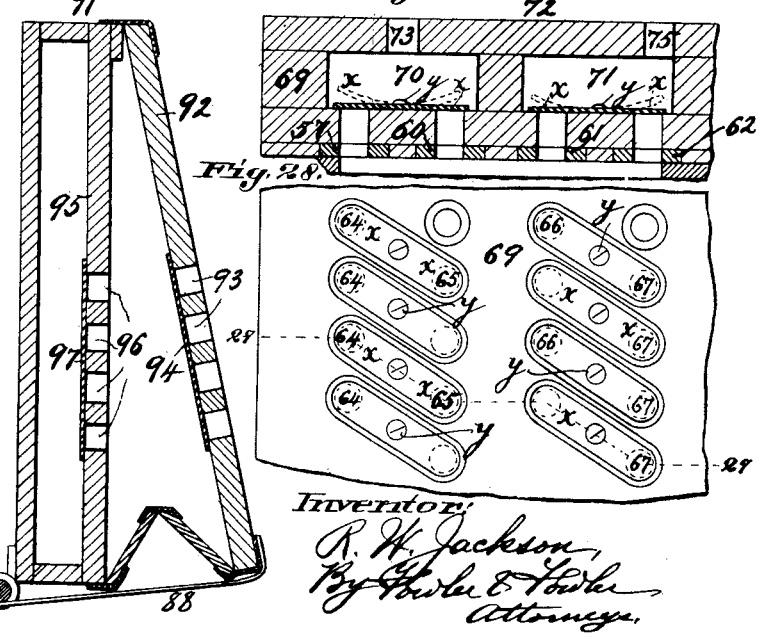
Witnesses:
Charles Pickles.
A. W. Davis
Inventor:
R. W. Jackson,
By Fowler & Fowler
Attorneys.

(No Model.) 7 Sheets—Sheet 5.
R. W. JACKSON.
PIPE ORGAN.
No. 480,949. Patented Aug. 16, 1892.
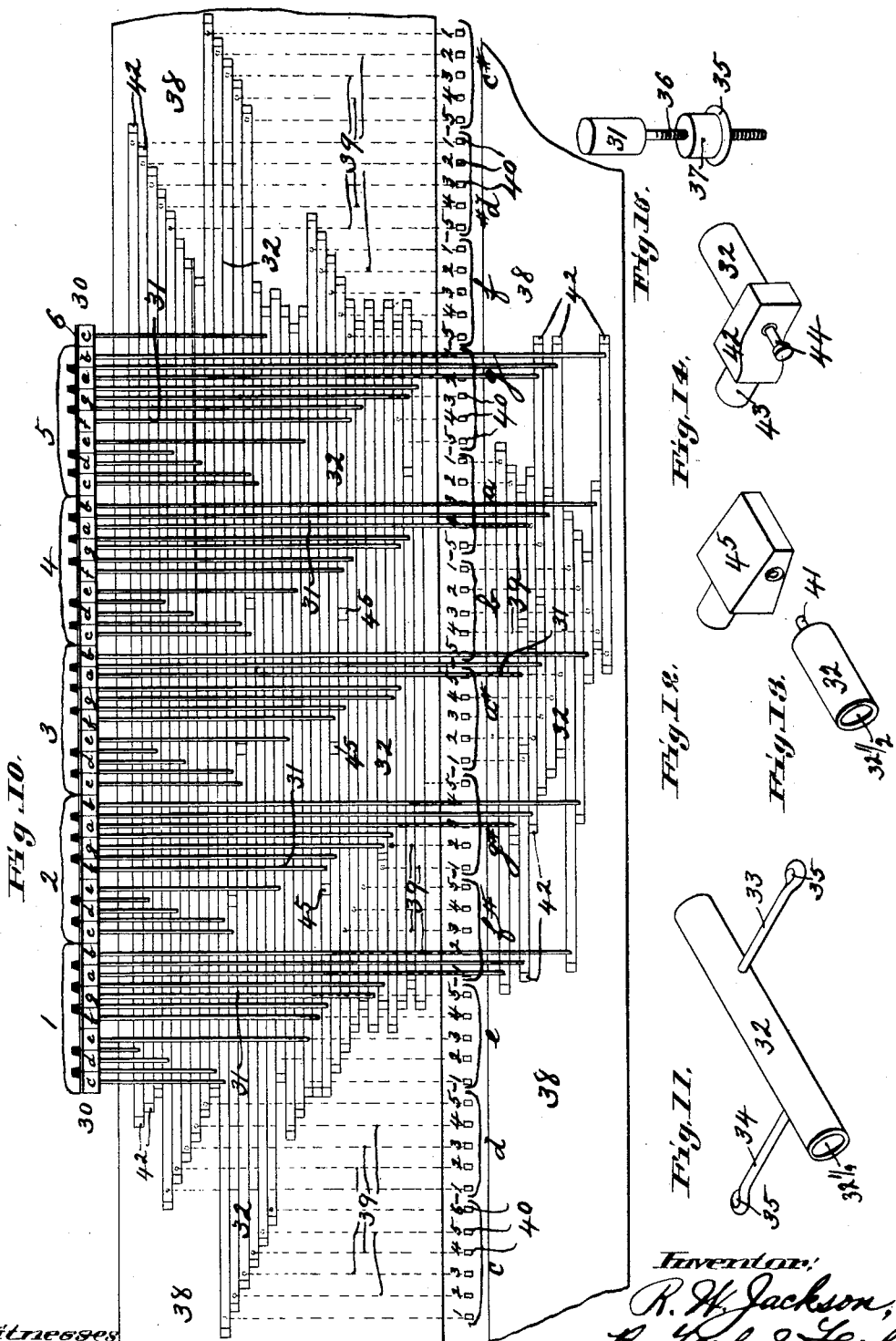
Witnesses
Charles Pickles
A. W. Davis
Inventor:
R. W. Jackson,
By Fowler & Fowler
Attorneys (No Model.) 7 Sheets—Sheet 6.
R. W. JACKSON.
PIPE ORGAN.
No. 480,949. Patented Aug. 16, 1892.
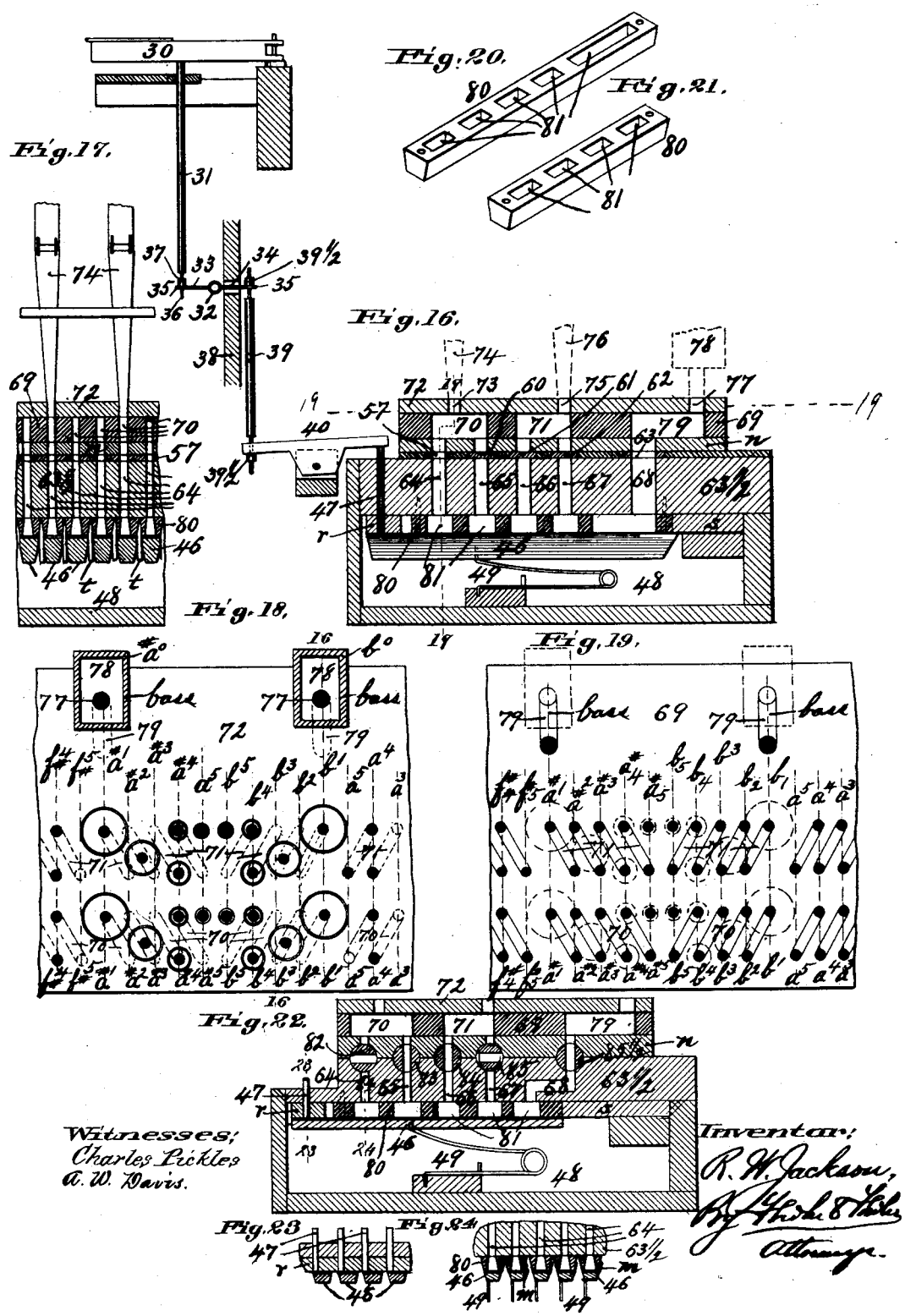

(No Model.) 7 Sheets—Sheet 7.
R. W. JACKSON.
PIPE ORGAN.
No. 480,949. Patented Aug. 16, 1892.
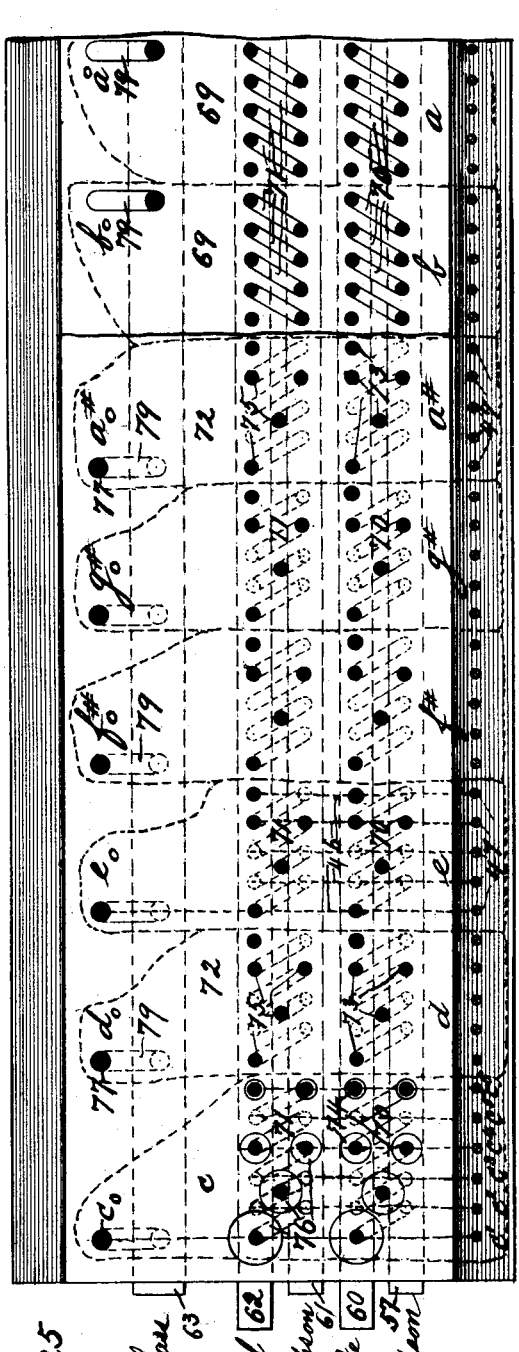
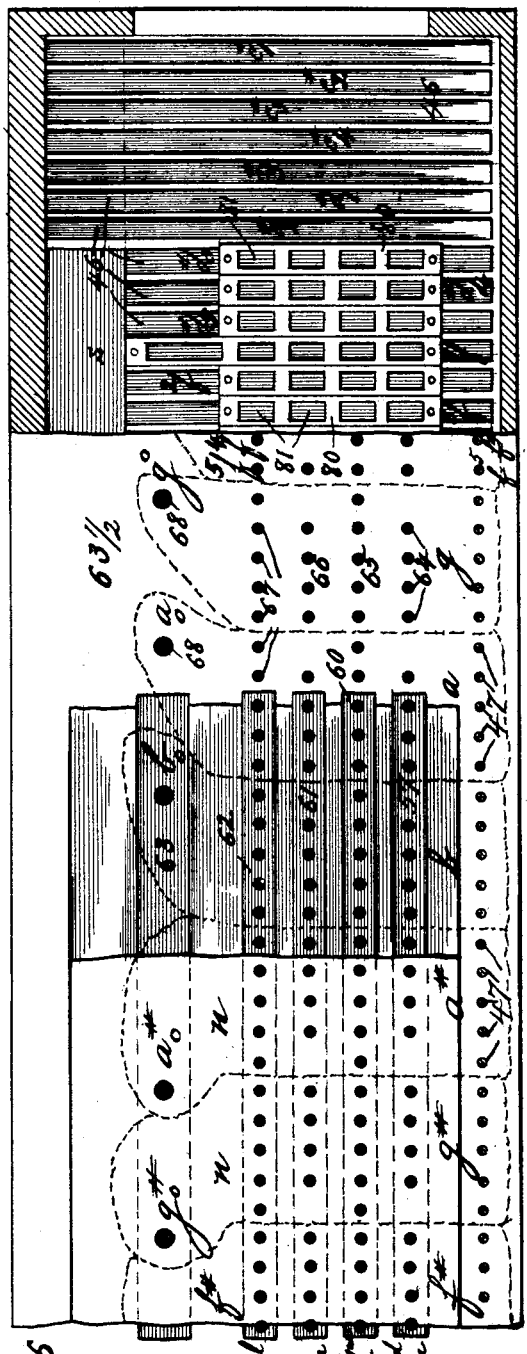
Witnesses:
Charles Pickles.
A. W. Davis.
Inventor:
R. W. Jackson,
By Thos. S. Hodie
Attorney

UNITED STATES PATENT OFFICE.

RICHARD W. JACKSON, OF CHESTER, ILLINOIS, ASSIGNOR TO THE JACKSON PIPE ORGAN COMPANY, OF SAME PLACE.

PIPE-ORGAN.

SPECIFICATION forming part of Letters Patent No. 480,949, dated August 16, 1892.

Application filed January 25, 1892. Serial No. 419,163. (No model.)

*To all whom it may concern:*

Be it known that I, RICHARD W. JACKSON, a citizen of the United States, residing at Chester, county of Randolph, and State of Illinois, have invented certain new and useful Improvements in Pipe-Organs, of which the following is such a full, clear, and exact description as will enable any one skilled in the art to which it appertains to make and use the same, reference being had to the accompanying drawings, forming part of this specification.

My invention relates more particularly to octave-couplers.

One of the objects of my invention is to decrease the cost and size of pipe-organs. In my arrangement I am enabled to use nearly one-half the number of pipes to produce the same number of tones and notes as produced in organs as now known, and am thus enabled to make an organ of nearly half the size of organs generally, while at the same time the number of notes and tones are preserved. By certain arrangement of the pipes I am enabled to still further diminish the space required for the pipes, and thus effect still further saving of space, and my organ therefore is even less than half the size of an ordinary organ.

Another object of the invention is to make the key resistance as light as possible. In pipe-organs heretofore constructed wherein octave-couplers are employed a mechanical device is used to couple the key of one octave to the key of another, and thus the key resistance of the octave-key operated by the key struck by the performer is added to the resistance of the key so struck by the performer, and hence the key resistance is materially increased and becomes so great as to require considerable force to operate the keys. The resistance of the keys when the octave-coupler is brought into use is therefore different from and greater than the resistance when the octave-coupler is not used. In my invention the key resistance remains the same when the octave-coupler is employed as when it is not, there being no increase of key resistance, and I also aim to make the key resistance as light as possible, so that an organ can be operated by a touch as light as that required for the piano. My coupler is not a mechanical coupler in the true sense of the word, but is an arrangement whereby the octaves of a key may be caused to sound without operating the key of that octave of either stop, or it can be worked separately or together, as desired.

The invention has certain other objects, which will be hereinafter set forth.

To carry out the objects of my invention, I preferably arrange the pipes of the same notes and their octaves in a group. Thus, for instance, all the C's are preferably arranged together, all the C♯'s together, &c.—that is to say, the different octaves of C of harmonique flute, stopped diapason, principal, and open diapason are grouped, preferably, together. Certain stops on the organ are substantially the same in timbre, but vary only in the pitch of the tone. Thus, for instance, harmonique flute and stopped diapason are essentially the same in tone or timbre, but differ only in pitch, harmonique flute being an octave higher than the stopped diapason, and, vice versa, stopped diapason being an octave lower than harmonique flute, and principal being an octave higher than open diapason, and, vice versa, open diapason being an octave lower than principal, but in tone and timbre being the same.

In carrying out my invention I arrange to have one set of pipes common to harmonique flute and stopped diapason, for instance, and another set of pipes common to principal and open diapason—that is to say, harmonique flute and stopped diapason speak upon the same set of pipes and open diapason and principal speak upon the same set of pipes, and each of these different stops has its requisite tone and timbre and each note thereof its correct pitch. I use harmonique flute, stopped diapason, principal, and open diapason herein merely to illustrate my invention, which, however, is independent of any special set or number of stops.

The invention will be best understood by referring to the accompanying drawings, illustrating one form of my invention.

Figure 2:
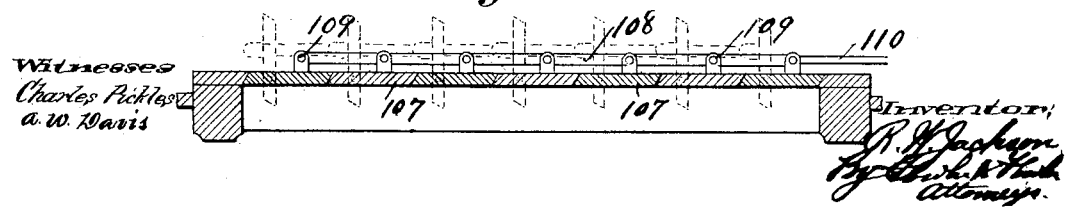

In the said drawings, Figure 1 is an elevation of my organ. Fig. 2 is a horizontal section of the swell of the organ. Fig. 3 is a rear elevation. Fig. 4 is a plan showing the organ with the parts removed to show the slides and illustrating the keyboard, stops, and connections with the slides and the bellows at the rear of the organ. Fig. 5 is a plan view with the parts removed to illustrate the air-storage reservoir. Figs. 6 and 7 are detail views showing part of the connections for operating the slides through the instrumentality of the stops. Fig. 8 is an elevation showing the arrangement of the organ-pipes as seen from viewing the organ from the front, the casing of the organ being removed. Fig. 9 is a transverse vertical section of the feeder of the bellows. Fig. 10 is a front elevation illustrating the keyboard and the key connections. Figs. 11, 12, 13, 14, and 15 are detail views of the key connections. Fig. 16 is a sectional side elevation on the line 16 16 of Fig. 18, showing the connections between a key and one of the valves and illustrating the wind-chest and the grooves and passages between the wind-chest and the pipes. Fig. 17 is a sectional view on the line 17 17 of Fig. 16. Fig. 18 is a plan view showing part of the organ-pipes. Fig. 19 is a sectional plan on the line 19 19 of Fig. 16, taken below the level of the pipes. Figs. 20 and 21 are detail views illustrating the partitioned valve-seats. Fig. 22 is a modification of part of the apparatus shown in Fig. 16. Figs. 23 and 24 are sectional detail views on the lines 23 and 24, respectively, of Fig. 22, showing a modification of the key-operated valves governing the passage of wind to the organ-pipes. Figs. 25 and 26 are diagrammatic views showing all the various air-passages in the entire organ leading to the organ-pipes, taken at different levels. Figs. 27 and 28 are sectional and plan views, respectively, illustrating details of a modification, Fig. 27 being taken on the plane of the line 27 27 of Fig. 28.

The same marks of reference indicate the same parts throughout the different figures of the drawings.

30 is the keyboard, which may be of any range and in one or more tiers, if desired. From the various keys 30 of the keyboard lead downwardly vertical rods 31 to rollers or rock-shafts 32 in the usual way. The rollers 32 are preferably made of metal tubing to secure compactness of arrangement, greater rigidity of connection, and at the same time lightness of construction. Each tube has a plug 32½, of wood, in its end to receive journal-pins, hereinafter specifically designated.

The rollers or rock-shafts 32 are each provided with arms 33 and 34, extending from opposite sides thereof. The arms 33 and 34 are preferably made of wire and at their outer ends are fashioned to form eyes 35. The lower ends of the vertical rods 31 are each provided with screw-threaded wires 36 and a button 37, which may be adjusted along the end of the wire 36, so as to regulate the length of the said vertical rods 31. The wire 36 passes through the eye 35 in the end of the arm 33, and the button 37 rests upon the upper surface of the eye 35 of the said arm 33. The keys 30 are mounted in the usual way and connected with the vertical rods 31 in a well-known manner. The arm 34 projects through the roller-board 38 and is engaged by a vertical rod 39, similar to the rod 31, the said vertical rod 39 having a screw-threaded reduced part at each end and carrying at each end an adjustable button 39½, the uppermost one of which comes against the upper surface of the eye 35 on the arm 34 and the lower button of which comes against the under side of the outer end of a pivoted lever 40. There is a lever 40 and a connection, as described, between the same and the keys for each and every key of the keyboard.

Each of the rock-shafts or rollers 32 is provided at one end with a journal-pin 41, which takes into brackets 42, carried by the roller-board 38, by means of a round part 43, projecting from said brackets, they being received into holes bored into the roller-board. The other ends of the rollers or rock-shafts 32 are adapted to have inserted in them journal-pins 44 through brackets 42 at the other end of said rock-shafts. By this means the rock-shafts or rollers are journaled at each end. Where two rock-shafts come together and are in the same horizontal line, I journal the adjacent ends in brackets 45. The vertical shafts and the brackets are preferably made of wood. The connections between the keys and the lever 40 are all substantially of the usual construction, except as noted above, but the arrangement of the rollers or rock-shafts is new.

Owing to the fact that in my invention, as previously set forth, all the pipes of the same note and its octaves are preferably grouped together, and also by reason of the fact that in the present invention in order to further economize space every group of pipes corresponding to each alternate note of the chromatic scale is arranged at opposite sides of the center of the organ, a new or modified way of arranging the rollers or rock-shafts is employed.

I have previously mentioned in a general way that in my organ the pipes of the octaves of the notes are preferably grouped together to carry out the invention. The general arrangement of pipes in organs is to have the pipes over the sound-board in the order found on the keyboard—that is to say, the general arrangement is to have the pipes of the lower register of the organ at the left-hand side and those of the highest register at the right-hand side of the organ. It will be noted that by grouping the pipes as referred to in my organ I am enabled to economize space, inasmuch as the pipes in the group are an octave apart, and consequently vary greatly in size from each other, so that it is possible to arrange such pipes within smaller compass than if all large pipes were placed together, as will be seen by reference to Figs. 8 and 18 and the left-hand part of Fig. 25, wherein my arrangement of pipes is shown.

To further economize space in arranging the pipes and secure a symmetrical arrangement of pipes, I place the group of octaves of the pipes of each alternate note of the chromatic scale at opposite sides of the center of the organ. For instance, I arrange the group of C's on the left-hand side and the group of C#'s on the right-hand side of the organ, and the group of D's on the left-hand side of the organ next to the C's, and then the group of D#'s on the right-hand side of the organ next to the C#'s, &c. It is of course not essential in carrying out the principal features of my invention to make such an arrangement of pipes as last specified; but I do this principally to further economize space, for it will be evident that by so shifting the pipes the pipes can be arranged more closely together and compactly—that is to say, the small pipes or pipes of medium size can be inserted between spaces left between the large pipes, where a large pipe itself could not be inserted between pipes. What applies to individual pipes also applies to a group of pipes.

In Figs. 3 and 8 I have shown such an arrangement of pipes as last referred to wherein the C's and the C#'s are at the extreme ends of the organ, and the arrangement is such that the pipes are stepped downwardly from the right and left hand side of the organ to the center; but it is obvious that the C's and C#'s may be arranged at the center of the organ at opposite sides of the middle thereof and the other pipes alternately on each side thereof, as indicated, which would make the arrangement such that the pipes of the organ would be stepped upwardly from each side of the organ to the center—that is to say, the tallest pipes would be at the center and the shortest pipes at the ends of the organ—instead of in the present arrangement shown in Figs. 3 and 8, in which the tallest pipes are at the ends and the shortest pipes at the center of the organ. The last arrangement that I have referred to, with the tall pipes at the center of the organ and the short pipes at the ends, would make the casing of the organ smaller and make the organ look much smaller for the reason that a casing with a peaked top could be used to inclose the pipes, whereas in the arrangement shown in Figs. 3 and 8 a square casing is used and considerable waste space inclosed casing, such space being the substantially-V-shaped space from the top ends of the pipes to the center of the organ, Figs. 3 and 8. The arrangement of pipes referred to necessitates a change in the arrangement of the rollers of the roller-board and a rearrangement of the connections between the rollers of the roller-board and the keys and valves operated thereby.

All the connections of the keys with the rollers or rock-shafts and the arrangement of the rock-shafts or rollers are shown in Fig. 10, wherein the vertical dotted lines extending from the different rollers or rock-shafts indicate the vertical rods 39 on the other side of the roller-board. The arrangement of the rollers or rock-shafts will be understood from Fig. 10 in view of the previous detailed description. The levers 40 each control a valve 46 by means of pins 47, interposed between the inner ends of the levers 40 and the outer ends of the valves 46. These valves 46 are arranged in the wind-chest 48 and held to their seats by springs 49 in the usual way. The valves 46 control the passage of air from the wind-chest to the pipes of the organ and correspond in number to the keys of the keyboard. Each valve 46 controls the passage of air to the different slides to give harmonique flute, stopped diapason, &c. This is usually the arrangement in organs. Preferably above the keyboard are arranged two rows of stops 50 and 51. (See Figs. 1 and 4.) These stops correspond to the different qualities of tones in the organ, such as harmonique flute, stopped diapason, &c. From the stops in the same horizontal line extend rods 52 and 53 to a T-lever 54, pivoted to a support 54½, carried at the back of the wind-chest 48. The outer end of this T-lever is connected to a bar 55, which in turn is articulated to a lever 56, that is pivoted to one of the slides 57. The stops are arranged in sets of two, there being two stops for each slide connected to opposite arms of the T-lever, so that the slides may be operated in either direction by pushing in the stops instead of having to pull out a stop after it is pushed in in the case where only one stop is used for each slide. The advantage of this arrangement is that the stops may be pushed in to draw a slide or to discontinue its use, which operation may be effected more rapidly and conveniently than pulling out stops. From a T-lever 54 (see Fig. 7) next beneath the T-lever 54 shown in Fig. 4 and which is connected to the next set of stops extends a bar 58 to a lever 59, pivoted at the opposite end of the organ and operating another slide 60. The slides 61, 62, and 63 are also connected with levers, bars, T-levers, and stops. When a slide corresponding to any stop—such, for instance, as harmonique flute—is operated and the keys of the organ are struck, the pipes giving the harmonique-flute tone will speak. When other slides are brought into use, other pipes corresponding to those slides and giving different qualities of tone will sound. So, also, when one or more or all of the stops are brought into use all different combinations of the various pipes corresponding to the different qualities of tone will be produced. In organs as now constructed there is in each set of pipes corresponding to the different qualities of tone a pipe for nearly every key of the keyboard, and when the slides are brought into use and a key is struck the note corresponding to that key and the pipe corresponding to that slide will sound.

It is well known that certain of the tones of the organ are essentially the same in timbre or quality, but differ only in pitch. Thus, for instance, harmonique flute and stopped diapason are the same tone in quality, but differ from each other in pitch only. So, also, principal and open diapason are the same sound in essential characteristics, but differ only in pitch, these various sounds being an octave different in pitch. So also gamba and violin are the same in timbre, but differ only in pitch, being an octave apart. If then it is possible to arrange the pipes of an organ so that one set of pipes will answer both for harmonique flute and stopped diapason and one set of pipes for principal and open diapason and the arrangement is such that the correct pitch of these different stops will be given when any key is struck, the number of pipes of an organ can be halved.

In carrying out my invention this is the arrangement I adopt—to wit, making one set of pipes answer both for harmonique flute and stopped diapason, for instance, and one set of pipes answer both for principal and open diapason, for instance.

To best carry out the objects of my invention, as before stated, it is required that the pipes corresponding to the octaves of any note be arranged in a group together, thus, for instance, all the C's being arranged together, all the D's together, &c.

In organs as now constructed there are clear spaces or channels transverse of the sound-board, (see Fig. 27,) over and running lengthwise of the valves 46, and under and transverse of the slides, leaving a clear open space been any one valve and all of the slides. Between these different channels there are of course transverse partitions between the keys, separating the transverse channels from one another.

In my invention I provide, also, longitudinal partitions between and under the slides over the valves 46. To do this in the most practical manner now known to me, I take a solid block of wood 63½ and bore holes 64, 65, 66, 67, and 68 through the same, (see Fig. 16,) making in effect partitions between the slides and above valves 46. This also, of course, makes in effect transverse partitions between adjoining valves. The longitudinal partitions referred to are one of the features of my invention, and they and the purpose thereof will be set forth in full hereinafter.

My organ is constructed in general respects like any other organ as to the slides, as previously set out; but above the slides I arrange, if preferred, a board $n$, perforated to correspond to the slides, and above this perforated board is placed a board 69, having diagonal grooves 70, spanning the space between the note-giving perforations 64 and 65 of the two adjacent octaves in stopped diapason and harmonique flute, and the diagonal grooves 71, connecting the note-giving perforations 66 and 67 of the two adjacent octaves is open and principal, as clearly shown in Figs. 16, 18, 19, and 25, one pipe only being used for each groove, or, in other words, one pipe being common to two note-giving perforations of the adjacent octaves of harmonique flute and stopped diapason and principal and open diapason, respectively.

In Figs. 18 and 19 I have illustrated by a series of parallel dotted lines diagrammatically the valves corresponding to each key and note in the organ, and have designated each of these lines by its proper note or letter. In making these designations I have used primes or indices "$1$," "$2$," "$3$," "$4$," "$5$," and "$6$," with the letters corresponding to the chromatic scale, the "$1$" indicating the lowest note and the "$5$" or "$6$" the highest note of the keyboard, except that the index or prime "$0$" is used with letters to indicate the bass-pipes. Where a letter indicating any note of the chromatic scale is used without a prime or index, I intend to designate generally the note and its octaves. By inspecting the keyboard it will be seen that in the arrangement shown in the drawings there are six C's, but only five keys of the other notes of the chromatic scale. Over the grooved piece 69 is arranged a perforated board 72, the perforations 73 in which are over the grooves 70, being located at any suitable place along said grooves and adapted to receive the organ-pipes 74 of harmonique flute and stopped diapason, for instance. In the board 72 are also perforations 75 at any place along the grooves 71, which receive the organ-pipes 76, common to principal and open diapason, for instance. It will be understood that a group of pipes representing the octaves of any note are entirely independent of any other group of octaves. In the board 72 are perforations 77, into which the twelve bass-pipes 78, controlled by the slide 63, are inserted. In the grooved piece 69 at the rear of the organ are grooves 79, which, however, are not necessarily diagonal grooves, as will be seen by reference to Figs. 18, 19, and 25. These grooves 79 run backward and are provided merely in order to secure room for the bass-pipes, which are very large. It will be understood that the grooves 79 of the bass-pipes do not preferably connect together adjacent octaves, there being a full set of bass-pipes for the bass-stop. As many bass slides or stops may be used as desired. I have only shown one bass-slide in the present case, as it will serve to illustrate my invention.

With the foregoing explanation in mind, suppose that the harmonique-flute stop is operated to cause the perforations in the slide 60 to register with the perforations 65 and open communication between said perforations and the grooves 70, and let us suppose that lowest C—that is, C', which is shown as nearest the left hand in the C group in Fig. 25—is operated. This will cause the organ-pipe shown by the black dot over harmonique flute at the middle left-hand part of the C group in Fig. 25 to sound and will give lowest C of harmonique flute, which will be a four-foot tone.

Inasmuch as only one set of pipes is used in common between harmonique flute and stopped diapason and in view of the fact that harmonique flute is an octave higher than stopped diapason, it will be evident that to complete the compass of harmonique flute it will be necessary to add to the upper register of said set of pipes representing stopped diapason twelve more pipes, constituting an octave of the chromatic scale, and the same remarks apply, *mutatis mutandis*, to open diapason and principal in an obvious manner. The black dots shown in Fig. 25 over harmonique-flute slide at the extreme right of the group of octaves indicate the perforations in which the pipes are inserted to complete the compass of harmonique flute. These pipes do not sound when stopped diapason is drawn, there being no groove between the perforations referred to and any of the perforations of stopped diapason, as clearly indicated in the drawings.

Suppose, now, that the harmonique-flute slide is pushed in, so as to cut off communication between the perforations 65 and the grooves 70, and that stopped diapason is operated to cause perforations in its slide to register with the perforations 64, and suppose that the lowest C on the keyboard is operated, as before. No pipe will speak, because there are no pipes or perforations over stopped-diapason slide corresponding to the lowest octave of the keyboard. If, however, the bass-slide is brought into use, the bass-pipes will be caused to speak when the keys in the lowest octave of the keyboard in stopped diapason are used, and that will give to stopped diapason the chromatic scale throughout the keyboard. If $C^2$ be struck, the air will run along the groove 70 and cause the pipe to speak which was sounded when harmonique flute was brought into requisition and key $C'$ was operated.

As one set of pipes is used in common between stopped diapason and harmonique flute and as harmonique flute is an octave higher than stopped diapason, it will be obvious that to complete the compass of stopped diapason it will be necessary to add twelve pipes to the lower end of stopped diapason to complete the compass of the last octave of the chromatic scale of stopped diapason. This I do in the present instance by bringing into use the bass-pipes, as previously referred to, by suitably manipulating the bass-slide. The same remarks apply, *mutatis mutandis*, to principal and open diapason in a manner obvious from the foregoing. The pipes of the top octaves of stopped diapason are made double length and speak harmonique tones, which does not interfere with the character of that stop, but simply makes it speak more brilliantly. It will be seen, therefore, that the compass of harmonique flute, stopped diapason, principal, and open diapason is the same as in the ordinary organ, for I add sufficient pipes to the organ in the manner indicated to supply the desired number of tones.

Suppose that harmonique flute and stopped diapason be in use and that $C'$ be struck, as before. This will cause bass-pipe $C^0$ to sound for stopped diapason and the pipe over harmonique flute to the extreme left to sound for harmonique flute, as before, the same two pipes previously referred to. Thus stopped diapason and harmonique flute will speak together, the notes thereof being octaves of each other and being coupled together, as it were, by my invention, which I therefore term an "octave-coupler," since it couples octaves together.

Now suppose that harmonique flute is brought into requisition in connection with stopped diapason and that $C^2$ on the keyboard is operated. The pipe over the second black dot near the middle of the C group in Fig. 25 will speak for harmonique flute, the air traveling up the perforation 65 along the groove 70 to said pipe. At the same time the air will pass up the perforations 64 to one of the grooves 70 and will cause the pipe over harmonique-flute slide at the first black dot to the left of the C group to sound for stopped diapason as well. Thus two pipes have sounded by the operation of one key, the first-mentioned pipe being an octave lower than the last-mentioned pipe. Thus it is seen that the octave of one pipe is coupled to the octave of the same set of pipes not by mechanically connecting the keys of the keyboard together, but preferably by grouping the pipes pertaining to a key and the octaves thereof together and arranging the pipes along grooves, as shown. In this way I have an octave-coupler which does not increase the key resistance, the resistance of which always remaining the same whether few or many slides are drawn and pipes are speaking. The same results will follow when the same operation is gone through with the stops principal and open diapason in sounding the pipes common to these two stops, which will be obvious from the foregoing description.

Now suppose that all of the stops are brought into operation. It will be plain that pipes corresponding to each stop will speak upon a depression of any one key by the octaves of stopped diapason and harmonique flute being coupled together and the octaves of principal and open diapason being coupled together. In each group of pipes and octaves thereof is arranged a bass-pipe, which is caused to speak when the bass or the keys of the lowest octave on the keyboard are struck. It will be obvious from the foregoing that the same coupling of octaves takes place with reference to other keys of the keyboard other than the C-keys when the stops are suitably operated and said keys are struck. It will be seen that nearly half the number of organ-pipes can be used in the present case and yet all the tones of the organ will be preserved, the capacity or volume being the same in the present case as in organs now constructed. If it were not necessary to add independent pipes to complete the upper and lower register of the stops, as above explained, the number of pipes required in my system would be just half of the number essential to the proper working of the ordinary organ; but even as it is my invention substantially or nearly halves the number of pipes required for the usual pipe-organ.

Having more particular reference to Fig. 16, it will be noted that were no provision made therefor when two octaves were coupled together by means of the diagonal grooves referred to while any key was struck and pipes an octave apart coupled together by the operating of a key—that is to say, when $C^2$ was operated, for instance, and either or both of the stops harmonique-flute and stopped diapason were brought into use—the air would run in both directions from the valve $C^2$ (see Fig. 25) along the grooves 70 and sound the two pipes referred to in the foregoing and could pass down the perforations 64 and 65 along the valves corresponding to $C^3$ and $C'$ and would cause the other notes in the line of $C^3$ and $C'$ to sound, depending upon what slides or stops were in operation. The air after passing along the valves of $C^3$ and $C'$ and causing the pipes along said line to indiscriminately sound could also pass along the diagonal grooves from the pipes over the valve 46 corresponding to $C^3$, and from there by the diagonal grooves could pass to other pipes in the line of the valve corresponding to $C^4$, for instance, and would cause the pipes of the organ to sound without any reference to the key struck. To provide against this, I preferably provide above the valves 46 the perforations 64, 65, 66, 67, and 68, before referred to, in board $63\frac{1}{2}$, making in effect longitudinal partitions between the slides and notes of each slide, as before explained, and I preferably furnish the partitions with a partitioned valve-seat 80 of substantially the form shown in Figs. 20 and 21 and made of metal or other substance. This valve-seat has holes 81 through it corresponding to the perforations 64, 65, 66, 67, and 68, so that when the valve corresponding to the key $C^3$, for instance, is against its seat it will be impossible for the air to pass from the pipes sounded by striking the key $C^2$ to other pipes, the communication between such pipes and the pipe sounded being cut off by the partitions and the partitioned valve-seat when any valve 46 is against its seat. This partitioned valve-seat does not, of course, prevent the air from passing up through any of the perforations 64, 65, 66, 67, and 68 when any valve is operated by being depressed away from any given partitioned valve-seat. The apertures in the partitioned valve-seat 80 are made of larger cross-sectional area than the area of the perforations 64 65, &c., in order to better allow the wind to reach the pipes when the valves 46 are operated.

In organs as now constructed there are no longitudinal partitions of the character described interposed between the valves 46 and the slides, (see Fig. 27,) so that my present invention could not be employed in organs as now constructed without using such partitions or some equivalent therefor. It may be said, therefore, that these partitions or some means of cutting off communication between the pipes must be used to carry out my invention, and this is one of the principal features of and may be said to be the very gist of the invention. It will be apparent that the valves 46 may be caused to seat directly against the partitions referred to instead of against the partitioned valve-seat 80, inasmuch as when any given valve was against its valve-seat the indiscriminate speaking of the pipes would be obviated. So, also, it will be apparent without illustration that the perforated or partitioned block $63\frac{1}{2}$ might be dispensed with and the slides placed across the partitioned valve-seats 80, which may all be cast in one piece, and still carry out my invention, it only being necessary to have partitions, as indicated, between the slides or to provide some means to prevent the indiscriminate blowing of the pipes, and the partitions of the partitioned valve-seat would answer this purpose.

The metal valve-seat is provided to secure a more perfect seat for the valves, metal keeping its shape better and not being subject to atmospheric changes and liable to leak from warping, as wood is. Blocks $r$ and $s$ are placed at each end of the partitioned valve-seat, the free ends of the valves 46 resting against the block $r$, through which the pin 47 passes, and the hinged ends of the valves 46 being secured to the block $s$. These blocks are made of the same thickness as the partitioned valve-seat. Between the different valves 46 are pins or wires $t$. (See Fig. 17.) These wires prevent the valves from moving sidewise and are the same in every respect as those now used in organs. The partitioned valve-seat shown in Fig. 20 is one which has provision for the bass-pipe. The openings in the partitioned valve-seat for the bass-pipes are made longer than the other openings to make a larger aperture for the bass-pipes which require more air than the other pipes. In the valves corresponding to keys in which there are no bass-pipes the partitioned valve-seat is made shorter and has, of course, no provision for a bass-pipe, the same being shown in Fig. 21 and the right hand of Fig. 26.

In Figs. 27 and 28 is illustrated another way of preventing the indiscriminate speaking of the pipes when any key is depressed in my organ, the same being a substitute for the partitions heretofore referred to. In this modification the longitudinal partitions are dispensed with and there is a transverse clear open space beneath all the slides, as seen at the lower part of Fig. 27. In place of the partitions I use in the present instance valves *x*, which are preferably placed in the diagonal grooves 70 and 71 over the perforations in board *n* above the slides. The valves in each diagonal groove I may make in one piece of some suitable material, which is fastened in place by a screw *y*. The valves can be constructed in any suitable way. I show herein the present form of valve merely to illustrate how valves could be used for the purpose set forth, but do not wish to limit myself to any particular form or kind of valve for this purpose. When any slide is brought into use and a valve 46 corresponding to any key is operated, the air will pass through the perforation or perforations in the slide or slides in use and will raise the valve *x* and sound the corresponding pipe. If only one slide under any given diagonal groove is in use, only one valve will be raised in that diagonal groove, and the other valve in said diagonal groove will by the pressure of wind in the diagonal groove above it be held to its seat, and it will prevent the wind from passing down the perforation it is over and causing the indiscriminate sounding of the pipes, as previously set forth. I prefer the partitions to the valves for this purpose, as they are more reliable in operation and because they are fixed and not subject to derangement, as valves are, and are easier to construct.

While I have explained that in my invention all the octaves are grouped together, my invention, broadly considered, is not limited to such grouping, for it is evident that by suitable air connection (by a system of piping, for instance, instead of diagonal grooves) between the organ-pipes and the note-giving perforations of the slides indicated the same result will be accomplished and in the way set forth. The grouping of the octaves is, however, the preferable arrangement, as it simplifies the construction.

In Fig. 22 I have shown a modification of the slides 57, 60, 61, 62, and 63, and for such slides rotary valves 82, 83, 84, and 85, which may be made of a solid piece of round metal with perforations extending therethrough, as shown in the drawings, to correspond with the perforations above and below said rotary valves. It will be understood, of course, that these rotary valves are operated by the stops heretofore explained by suitable connections.

In Fig. 22, also, is shown a modification of the valves 46, and this modification is further illustrated in Figs. 23 and 24. In the said modification the valves 46 are laterally-swinging ones and are hinged and fastened to their seats along one edge thereof by leathers *m* or other flexible material. The pins 47 bear at one end of the valves 46 at the opposite edge from the leathers *m*, this being the free edge of the valves. (See Figs. 22 and 23.) The springs 49 are also used in this instance to hold the valves 46 to their seats; but the springs are preferably moved to beneath the free or opening edge of the valves 46 (see Fig. 24) instead of being at the longitudinal middle of the valves, as before. It will be noted that in the present instance the valves 46 are made of less length than the valves 46 shown in Fig. 16, wherein the valves are hinged at one end and swing in the plane of their length. The partitioned valve-seats are also made correspondingly shorter, the same opening being allowed for the bass-pipes as for the other pipes. The groove 68 in the present instance takes a right-angular form, as shown in Fig. 22. This allows the bass-pipes to be set farther back in the organ to secure room for them, as before. Inasmuch as the valve 46 opens along one entire edge, it will be seen that the air has freer access to the bass-pipes and those pipes located toward the rear or hinge of the valve 46 shown in Fig. 16. Such a valve affords the same amount of opening for one pipe as another; but where a valve is used as shown in Fig. 16 it is evident that when the same is depressed a greater opening will be allowed for the passage of wind at the front end of the valve, inasmuch as the space between the valve and its seat gradually gets less and less as it is nearer the hinge of the valve. By the modified valve 46 shown in Figs. 22, 23, and 24 this objection is obviated. The modified valve 46 also possesses the advantage of requiring less force to operate it than the valve 46 shown in Fig. 16 for the reason that, being shorter, the area of the valve is less. Consequently the total pressure exerted against the valve is less, and hence less force is required to operate such a valve. This, then, decreases the key resistance and is an obvious advantage. The modified valve 46 may be swung, hinged, or pivoted in any suitable way other than that described, so long as it retains its functions of opening laterally or along one side, without departing from the spirit of my invention.

86 and 87 are hinged foot-boards at the lower front part of the organ, having connected, respectively, thereto at their free ends straps 88 and 89, which pass rearward over rollers 90, attached to the inside of the front board and lower part of the organ by suitable brackets. (See Fig. 5.) These straps are attached, respectively, to bellows 91 at the rear of the organ, which bellows are located upon the vertical back board of the organ. The bellows are made substantially as shown in Fig. 9, they having a hinged part 92, with perforations 93 therein, covered by a flexible valve 94, which permits air to enter the said bellows, but prevents it from leaving the same by way of said perforations 93. The bellows proper are upon a hollow chamber 95, having perforations 96, being covered by a flexible valve 97, permitting air to enter the said chamber, but preventing its escape therefrom by way of said perforations 96.

From each end and the center of the chamber 95 passes by way of tubes 98, 99, and 100 the air which is compressed in said chamber to an inflatable storage-reservoir 101, mounted upon a shallow box 102, with which the pipes 98, 99, and 100 directly communicate. The reason for delivering the compressed air from the chamber 95 to the storage-reservoir through more than one pipe is to prevent vibration of the inflatable storage-reservoir, the vibrations of which often interfere with the tones of the organ, giving them a tremolo effect. The introduction of the air at each end and at the center of the storage-reservoir prevents the vibration of the storage-reservoir, and this is one of the features of the present invention. The box 102 is placed horizontally at the base of the organ. The storage-reservoir 101 has a series of pivoted levers (see Fig. 3) 103 attached to its sides in order to more readily hold the parts of the said inflatable reservoir in place and steady the same. The said inflatable reservoir has upon its top weights 104 to keep the air therein at a certain pressure and cause the reservoir to contract as the air is exhausted therefrom.

Above the storage-reservoir 101 is placed the wind-chest, the valves 46, operated by the keys, the slides, and parts, as shown in Fig. 16. Connection is made between the storage-reservoir 101 and the wind-chest 48 by means of vertical passage-ways 105 and 106, which pass from each end of the box 102 up the inside of the organ to each end of said wind-chest.

By operating the foot-boards 86 and 87 the bellows 91 are brought into use and air compressed into the chamber 95. The air passing down from this chamber, through the three pipes 98, 99, and 100, previously described, to the storage-reservoir 101 inflates the same, and the air is delivered from this storage-reservoir under pressure by way of the vertical passage-ways 105 and 106 to the wind-chest, thus supplying the power to cause the pipes of the organ to speak.

Instead of operating the bellows by foot-power they can be operated in any other suitable way—such, for instance, as a hand-lever, water-power, or an electrical motor, all of which make no part of my invention.

I provide my organ, also, with an arrangement known as a "swell" in organs, the swell being an apparatus whereby the casing of the organ may be opened or closed to increase the volume of sound at the will of the operator. At the front of the organ is pivoted at each end a series of vertical slats 107, which are connected together inside the organ by a stick 108, (see Figs. 1, 2, and 3,) pivoted to lugs 109, extending from the rear of the said slats. The stick 108 is in turn connected with a bar 110, and this is articulated to a lever 111, pivoted at 112 to any suitable part of the organ, and the other end thereof is connected with a reciprocating bar 113. The other end of this bar is provided with a spring 114, which normally tends to throw the bar and the lever 111 so as to close the slats 107 of the swell. The bar 113 is provided with a pin 115, which projects through the front of the casing of the organ. This pin is operated by a pivoted piece 116, which depends from the front board of the organ and protrudes adjacent to the right knee of the performer, so that the operator by pressing the pivoted piece 116 to the right operates upon the pin 115, so as to elongate the spring 114 and open the slats of the swell, thereby causing the volume of the organ to increase. When the pressure of the knee is removed from the pivoted piece 116, the tension upon the spring 114 draws the reciprocating bar 113 to its normal position and closes the slats of the swell.

Having fully set forth my invention, I wish to have it understood that I do not limit myself to the exact constructions and arrangements set forth, as many changes may be made in the organ described and still be within the spirit of my invention, only one exemplification of which I have set forth herein.

What I desire to claim and secure by Letters Patent of the United States as my invention is—

1. An octave-coupler consisting of a set of pipes having the octaves of any pipe grouped together, with air communication between the adjoining octaves, whereby when any pipe is caused to speak its octave or octaves also will respond.

2. An octave-coupler consisting of a set of pipes having air communication between the adjoining octaves and partitions for preventing any other pipes than the said octaves from responding.

3. An octave-coupler consisting of a set of pipes having the octaves of any pipe grouped together, with diagonal grooves between the adjoining octaves, whereby when any pipe is caused to speak its octave will respond.

4. An octave-coupler consisting of a set of pipes having the octaves of any pipe grouped together, with diagonal grooves between the adjoining octaves, and means for preventing any other pipes than the said octaves from responding.

5. An octave-coupler consisting of a set of pipes having the octaves of any pipe grouped together, with diagonal grooves between the adjoining octaves, and partitions for preventing any other pipe than the said octaves from responding.

6. A pipe-organ having a set of pipes common to two stops or slides representing different qualities of tones of the organ and means for affording air communication between the octaves of one stop and the octaves of another stop.

7. A pipe-organ having a set of pipes common to two stops or slides representing different qualities of tones of the organ, the pipe or pipes of any note and its octaves being grouped together, and means for affording communication between the octaves of one stop and the octaves of another stop.

8. A pipe-organ having a set of pipes common to two stops or slides representing different qualities of tones of the organ, the pipe or pipes of any note and its octaves being grouped together, and diagonal grooves for affording communication between the octaves of one stop and the octaves of another stop.

9. A pipe-organ having a set of pipes common to two stops or slides, with air communication between the octaves of one stop or slide and the adjoining octaves of another slide, valves operated by the keys, controlling the admission of air to the pipes, and means for preventing the indiscriminate speaking of the pipes when the keys are actuated.

10. A pipe-organ having a set of pipes common to two stops or slides, means for affording air communication between the octaves of one stop and the octaves of another stop, valves operated by the keys, controlling the admission of air to the pipes, and longitudinal partitions interposed between the said valves and slides.

11. A pipe-organ having a set of pipes common to two stops or slides, the pipe or pipes of any note and its octaves being grouped together, means for affording communication between the octaves of one stop and the octaves of another stop, valves operated by the keys, controlling the admission of air to the pipes, and longitudinal partitions interposed between the said valves and slats.

12. A pipe-organ having a set of pipes common to two stops or slides, diagonal grooves affording communication between the octaves of one stop and the octaves of another stop, valves operated by the keys, permitting the admission of air to the pipes, and longitudinal partitions interposed between the said valves and slides.

13. In a pipe-organ, a partitioned valve-seat, substantially as and for the purpose described.

14. An organ having the octaves of the pipe or pipes of the different qualities of tones and notes arranged in groups, those of the same pipe and its octaves being arranged in the same group, whereby economy of space is secured.

15. An organ having the pipe or pipes of the different qualities of tones and notes and their octaves of the chromatic scale arranged in groups alternately at opposite sides of the organ, whereby economy of space is secured.

16. An organ having the rollers or rock-shafts of the roller-board corresponding to the different keys arranged to bring the valves corresponding to the octaves of any note together in groups.

17. An organ having the rollers or rock-shafts of the roller-board corresponding to the different qualities of tones and notes and their octaves of the chromatic scale arranged to bring the valves corresponding to the octaves of any note together in groups alternately on opposite sides of the organ.

18. An organ having the rollers or rock-shafts of its roller-board composed of metal tubes, with a plug in the ends thereof and a journal-pin extending from said plug, substantially as and for the purpose set forth.

19. In a pipe-organ, a rotary valve 82, having suitable perforations, substantially as and for the purpose described.

20. The combination, with the slides of an organ, of two stops for each slide, each of which stops is positively connected together and is pushed in or out by operating the other and left in whatever position it is placed by the operation of the other, and connections intermediate the stops and slides, for the purpose described.

21. The combination, with the slides of an organ, of two stops for each slide, a T-lever for each set of stops, to an arm of which T-lever each of the stops is respectively connected, and connections from the third arm of the T-lever to the slides, substantially as and for the purpose set forth.

22. In an organ, the combination of a bellows, means for actuating the same, an inflatable storage-reservoir, and a plurality of pipes connecting the storage-reservoir with the bellows at different points, whereby vibration of the storage-reservoir is prevented.

23. In an organ, the combination of a bellows and foot means or treadles for actuating the same by suitable connections, an inflatable storage-reservoir at the bottom of the organ beneath the bellows, and means for affording air communication between the said bellows and reservoir and between the latter and the wind-chest.

In testimony whereof I have hereunto set my hand and affixed my seal, this 13th day of January, 1892, in the presence of two subscribing witnesses.

RICHARD W. JACKSON. [L. S.]

Witnesses:
H. K. SPENCER,
A. G. GORDON.